Dec. 9, 1930.   V. PANTENBURG   1,784,536
PROCESS FOR REGENERATION OF ADSORPTION MATERIAL
Filed July 23, 1925   3 Sheets-Sheet 1

Inventor:

Patented Dec. 9, 1930

1,784,536

UNITED STATES PATENT OFFICE

VITALIS PANTENBURG, OF FRANKFORT-ON-THE-MAIN, GERMANY, ASSIGNOR TO AMERICAN LURGI CORPORATION, OF NEW YORK, N. Y., A CORPORATION OF NEW YORK

PROCESS FOR REGENERATION OF ADSORPTION MATERIAL

Application filed July 23, 1925, Serial No. 45,723, and in Germany November 12, 1924.

This invention relates to a process of and apparatus for regenerating adsorption materials, for instance active carbon, gels or the like.

When charged adsorption materials are subjected to heat, the absorbed substances as is well known, are liberated and may be separated from the adsorption material so that the latter may be used again. Heat may be applied in various ways. It may be applied by externally heating the vessel containing the material to be regenerated or by heating the material from within the vessel by means of an electric current or by means of thermal contact with heated gases or vapors. The adsorption material may be subjected to heat while at rest or in motion through a regenerating chamber.

With the methods of regeneration used at present, it is not possible to so uniformly heat the material that all layers or portions thereof in the vessel have the same temperature. The unavoidable lack of uniformity in the temperature conditions of the different layers of the material treated, has as a necessary incident the condensation of the vapors or gases set free in the hotter zones on the material in colder zones. By the time these colder zones are heated to the required temperature, the material in the zones reached first by the heat, has as a rule been subjected to excessive heat, which means not only a disadvantage from the standpoint of economy, but above all, detrimentally affects the quality of the adsorption material and the substances dissociated from the latter by the heat.

Furthermore, the condensation of the adsorbed substances first driven off on the material in the colder zones causes the formation of a soft mass which in turn agglomerates the adsorption material to lumps. The result thereof is that these agglomerated portions can be regenerated only incompletely and by application of relatively large amounts of heat. In a system involving the movement of the material through a regenerating chamber, the formation of lumps may, moreover, cause a clogging of the apparatus.

The present invention has the general object to eliminate the disadvantages just scribed and, briefly expressed, consists in removing the adsorbed substances as quickly as possible after they are liberated by the heat and in the most direct way so as to avoid contact thereof with colder material.

For a full disclosure of the invention and the principle of operation upon which it is based, reference is made to the accompanying drawings in which—

Figure 1:
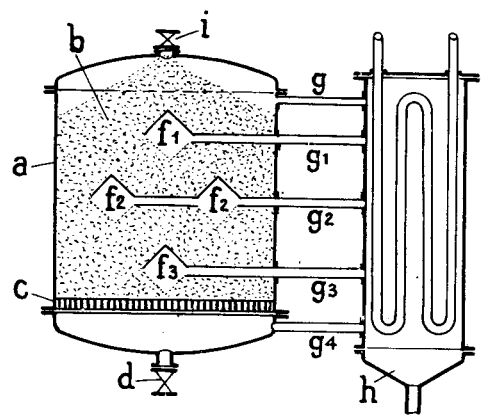
Fig. 1 is a more or less diagrammatic representation of one form of apparatus for carrying out the invention.

Having reference to Fig. 1, $a$ is a chamber containing the adsorption material $b$ and may be used for a regenerator as well as an adsorber. The adsorbing material, which in this instance remains undisturbed, rests on a grate $c$ near the bottom. The vessel has an opening $d$ at the bottom and an opening $i$ at the top. Intermediate the top and the bottom are formed gas spaces $f_1$, $f_2$ and $f_3$ by means of roof-shaped elements commonly used in the art for such purposes. These spaces are connected by means of conduits $g_1$, $g_2$ and $g_3$, respectively, with a condenser $h$. The space above the material in the chamber $a$ and the space below the grate $c$ are similarly connected with the condenser by conduits $g$ and $g_4$, respectively.

While it is not material to the characteristic points of the invention, it may be stated that during the adsorption cycle the gas to be purified or acted upon, in general, by the adsorption material, passes upwardly through the opening $d$ and the material and out through the opening $i$.

During the regeneration cycle, the chamber $a$ is heated in a well known manner to drive the adsorbed substances out of the adsorption material. According to the invention the gas collection spaces $f_1$, $f_2$ and $f_3$ are so disposed that the liberated gases or vapors or distillates, in general, need not pass through zones of materially different temperature conditions to flow out of the chamber, but to the contrary may be removed from the material substantially at the places where they are formed. The positions of the gas spaces $f_1$, $f_2$ and $f_3$ shown in Fig. 1 have no special significance other than to indicate that they are so distributed throughout the body of the adsorption material that at no time can there exist in the material such temperature differences between a point where gases are formed and a gas space as could cause a condensation of the gases on the intervening adsorption material. There is, of course, considerable latitude as to the distribution of the gas spaces. It is understood that the space above the material and below the grate $c$ are also gas collection spaces. The releatively colder zones, by the arrangement described, remain dry and the adsorbed substances may be liberated therefrom without the application of an excessive amount of heat. The gas and vapor pressures are maintained at a low limit throughout the body of the material which materially expedites the liberation of the gases at all points as will be readily understood.

Figure 2:
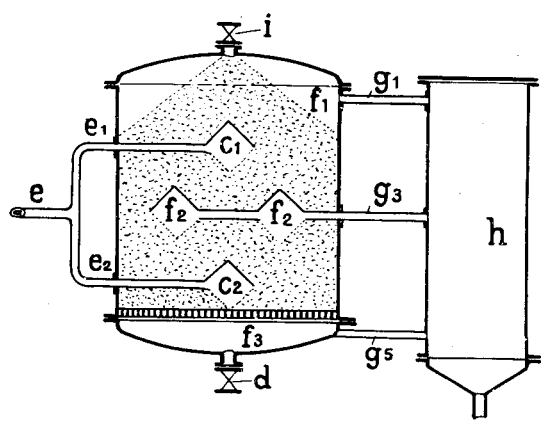
Figs. 2-4 are similar views of various modifications thereof.

The arrangement in Fig. 2 is generally similar to that shown in Fig. 1. The heat may be applied in any well known manner, either externally or internally, directly or indirectly by electricity. The charging of the adsorption material takes place in the same manner. However, to expedite the removal of the liberated gases or vapors, I apply a scavenging or rinsing fluid which may be introduced by means of the conduits $e$, $e_1$ and $e_2$ into the gas spaces $c_1$ and $c_2$. The gas space $f_1$ above the material, the gas space $f_2$ intermediate the top and bottom and the gas space $f_3$ below the grid are connected to the condenser $h$ by means of the conduits $g_1$, $g_3$ and $g_5$. The scavenging gas, which may be carbon dioxide, nitrogen or any other inert gas passes from the spaces $c_1$ and $c_2$ through the material to the collection spaces $f_1$, $f_2$ and $f_3$ and sweeps the liberated gases with them at such a velocity that they are not excessively heated or subjected to chemical decomposition.

Figure 3:
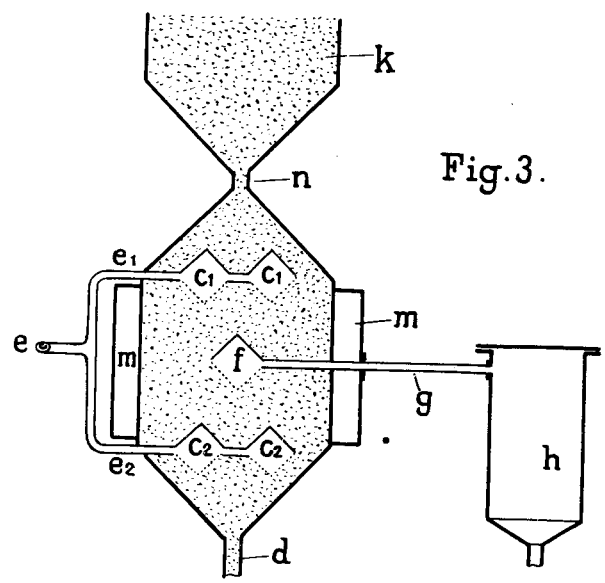
Figure 4:
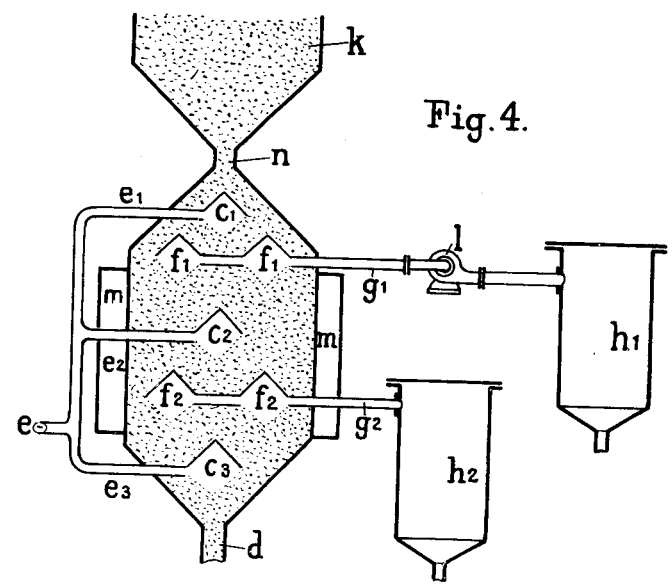

The arrangements shown in Figs. 3 and 4 are generally similar, but the material is not treated in situ as in the arrangements previously described. The construction is of the type in which the material is passed for regeneration from a vessel $k$ through the opening $n$ into and through the regenerating vessel $a$ and out of the outlet $d$. For the sake of illustration, I have indicated a heating chamber $m$ surrounding the chamber $a$. A scavenging gas is passed through the conduits $e$, $e_1$ and $e_2$ into the gas spaces $c_1$ and $c_2$ while the gases liberated by the heat collect in the gas space $f$ and flow through the conduit $g$ to the condenser $h$. Also here, as in the arrangements previously described, the distribution and disposition of the gas spaces is merely illustrative and may be modified in various ways. The collecting space $f$ is centrally located. As the material coming from a colder zone into a hotter zone passes the gas spaces $c_1$, the gas liberated is swept by the scavenging gas toward the collection space $f$ and during the passage of all the material through the chamber $a$ the gases, as they are liberated have to travel only a short distance to the collection space and the temperature gradient along their paths is not such that a condensation is likely to take place.

The arrangement in Fig. 4 differs from the last described arrangement principally by the separate removal of gas out of different zones of the regenerating chamber. The gas spaces $f_1$ are connected to a condenser $h_1$ while the gas spaces $f_2$ are connected to a condenser $h_2$. Scavenging gas is also used as before, but this feature is purely incidental as showing a preferred embodiment. The characteristic feature of the arrangement is the separate removal of the gases liberated in material, permitting the removal and collection of lower boiling fractions separate from high boiling fractions which latter are collected in condenser $h_2$.

Figure 5:
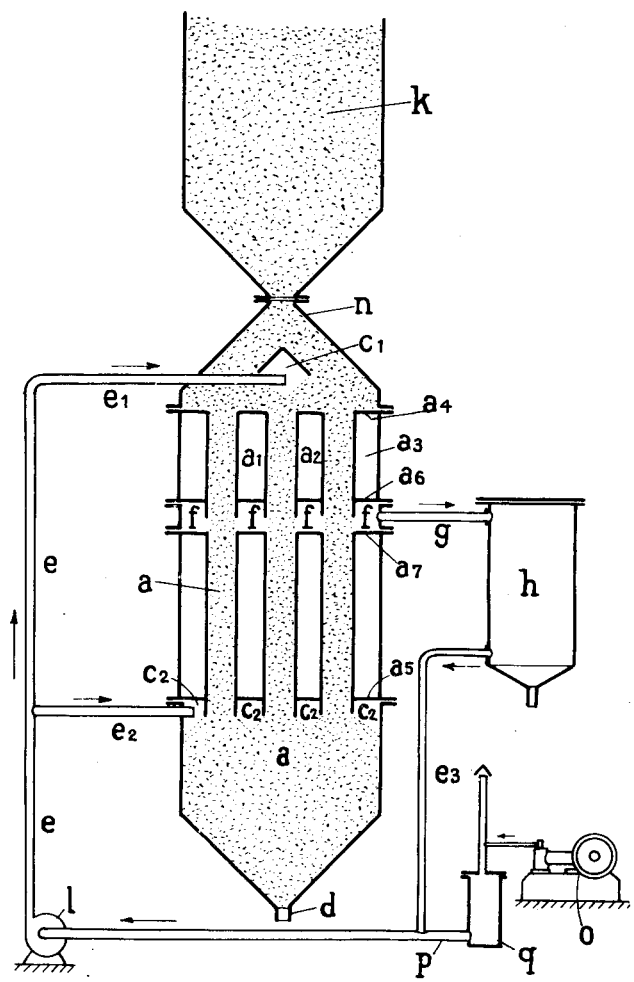
Fig. 5 is a diagrammatic representation of another form of apparatus for carrying out the object of the invention.

In Fig. 5 is shown a tubular regenerating system, in contradistinction to the shaft systems previously described.

From an adsorption chamber $k$ the charged material passes through a gate $n$ into the regenerating chamber $a$ which, in the main, consists of a plurality of tubes between a top header $a_4$, a bottom header $a_5$. Above the top header $a_4$ and below the gate $n$ is provided a gas space $c_1$. Intermediate the top and the bottom, preferably near the top, the tubes are in communication with gas spaces laterally thereof, connected by means of a conduit $g$ to a condenser $h$. While various forms of construction are possible, I preferably make the tubes of two sections, an upper section and a lower section, defining between them a gap. The adjoining ends of the sections are held in auxiliary headers $a_6$ and $a_7$. The header $a_6$ is disposed a short distance above the lower ends of the upper sections whereby a plurality of intercommunicating circular gas spaces $f$ are formed about the tubes. In addition, the lower ends of the upper sections may be expanded outwardly to form conical enlargements whereby the gas spaces are kept free of the adsorbing material. Similar gas spaces $c_2$ are formed around the lower ends of the lower tube sections. The scavenging gas passes through the conduit $e$ and then through the conduits $e_1$ and $e_2$ to the gas spaces $c_1$ and $c_2$, respectively. The adsorbed substances liberated by the heat principally in the lower section of the tubes, flow toward the gas spaces $f$ and then to the condenser where they are condensed. The scavenging gas is returned from the condenser by a conduit $e_3$ to the conduit $e$. The inevitable loss in scavenging gas may be compensated for by a suitable source connected to the scavenging circuit by means of pipe $p$.

By means of the scavenging circuit described, the cost of scavenging gas is reduced to a minimum and at the same time loss of distillate is avoided, as is obvious.

A blower $l$ or other suitable pressure device is used for promoting circulation of the scavenging gas. I preferably insert this blower between the regenerating chamber and the condenser, thereby materially increasing the efficacy of the treatment inasmuch as the relatively low pressure in the regenerator facilitates the liberation of the gases while the relatively high pressure in the condenser promotes condensation.

Like in the previously described arrangements, the gases liberated from the adsorption material do not pass through material of such temperature conditions that condensation could take place. Such gases as might be liberated in the upper zones flow from colder material through hotter material, while the temperature gradient between gas spaces $c_2$ and $f$ is bound to be relatively small.

Incident to the application of a scavenging gas, there is the danger of combustion in case the flow of scavenging gas should cease while heating of the material is continued.

In order to practically eliminate this danger, I preferably make the application of heat to the regenerator chamber dependent of the flow of the scavenging fluid. This may be done in various ways. An expeditious arrangement to this end may include an internal combustion motor $o$ which, on the one hand, furnishes the scavenging gas purified by a washer $q$ and drives the blower $l$ and, in the other hand, controls the source of heat for regeneration, as for instance by driving a blower supplying air to combustible material, the products of combustion of which are used to heat the tubes $a_1, a_2$, etc. By the correlation of the heating system and the scavenging gas circuit, indicated for the sake of illustration in connection with Fig. 5, a failure of the scavenging system can take place only concurrently with a failure of the heating system.

The use of a scavenging gas, as described, has also a material advantage in so far as it affords a protection against explosion in the regenerating chamber. It may happen that interstices in the charged material passing into the regenerating chamber contain combustible gas mixtures which under the effect of the heat might cause serious explosions. By introducing the scavenging gas, inter alia at the top of the regenerating chamber, i. e., in the coldest zone, the pressure of the scavenging gas prevents the movement of any gas carried into the regenerating chamber by the charged material downwardly with the latter. While part of the scavenging gas may be lost in this way, the loss may be kept so small as to be practically negligible. It is understood that the scavenging gas introduces near the bottom of the regenerating chamber keeps out air that might otherwise enter through the material at outlet $d$.

Fully aware that the invention may be carried out in various ways with apparatus of various forms.

I claim:

1. Process of regenerating adsorption material, which consists in passing a column of the material through a heat zone, passing an inert gas into the column near the end where the material enters the heat zone, and withdrawing gaseous products from the column intermediate the ends thereof.

2. Process of regenerating adsorption material, which consists in passing a column of the material through a heat zone, passing an inert gas into the column at points near the end where the material enters the heat zone, withdrawing gaseous products from points of the column more remote from said end, passing an inert gas into the column at points still more remote from said end and separately withdrawing gaseous products from the column at points still more remote from said end.

3. Process of regenerating adsorption material, which consists in heating a column of the material, passing currents of inert scavenging gas through said column from opposite ends thereof and withdrawing said currents of scavenging gas from a point intermediate the ends of said column.

In testimony whereof, I affix my signature.
VITALIS PANTENBURG.